United States Patent
Gao et al.

(10) Patent No.: US 11,217,229 B2
(45) Date of Patent: Jan. 4, 2022

(54) METHOD AND APPARATUS FOR SPEECH RECOGNITION, AND ELECTRONIC DEVICE

(71) Applicant: TENCENT TECHNOLOGY (SHENZHEN) COMPANY LIMITED, Guangdong (CN)

(72) Inventors: Yi Gao, Shenzhen (CN); Ji Meng Zheng, Shenzhen (CN); Meng Yu, Shenzhen (CN); Min Luo, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 0 days.

(21) Appl. No.: 16/921,537

(22) Filed: Jul. 6, 2020

(65) Prior Publication Data

US 2020/0335088 A1    Oct. 22, 2020

Related U.S. Application Data

(63) Continuation of application No. PCT/CN2019/085625, filed on May 6, 2019.

(30) Foreign Application Priority Data

Jun. 28, 2018  (CN) .................. 201810689667.5

(51) Int. Cl.
| | | |
|---|---|---|
| G10L 15/08 | (2006.01) | |
| G10L 21/0208 | (2013.01) | |
| H04R 1/40 | (2006.01) | |
| H04R 3/00 | (2006.01) | |
| H04R 3/04 | (2006.01) | |
| H04R 5/027 | (2006.01) | |

(52) U.S. Cl.
CPC .......... *G10L 15/08* (2013.01); *G10L 21/0208* (2013.01); *H04R 1/406* (2013.01);
(Continued)

(58) Field of Classification Search
CPC ......... G10L 15/08; G10L 15/26; G10L 15/20; G10L 21/0216; G10L 21/0208;
(Continued)

(56) References Cited

U.S. PATENT DOCUMENTS

| | | | |
|---|---|---|---|
| 9,930,448 B1* | 3/2018 | Chen | H04R 1/406 |
| 2015/0095026 A1* | 4/2015 | Bisani | H04R 3/005 |
| | | | 704/232 |
| 2019/0035390 A1* | 1/2019 | Howard | G10L 15/30 |

FOREIGN PATENT DOCUMENTS

| | | |
|---|---|---|
| CN | 104936091 A | 9/2015 |
| CN | 105765650 A | 7/2016 |

(Continued)

OTHER PUBLICATIONS

International Search Report of PCT/CN2019/085625 dated Jul. 24, 2019 [PCT/ISA/210].

(Continued)

*Primary Examiner* — Yogeshkumar Patel
(74) *Attorney, Agent, or Firm* — Sughrue Mion, PLLC

(57) ABSTRACT

A speech recognition method, apparatus, a computer device and an electronic device for recognizing speech. The method includes receiving an audio signal obtained by a microphone array; performing a beamforming processing on the audio signal in a plurality of target directions to obtain a plurality of beam signals; performing a speech recognition on each of the plurality of beam signals to obtain a plurality of speech recognition results corresponding to the plurality of beam signals; and determining a speech recognition result of the audio signal based on the plurality of speech recognition results of the plurality of beam signals.

19 Claims, 8 Drawing Sheets

(52) U.S. Cl.
CPC .............. *H04R 3/005* (2013.01); *H04R 3/04* (2013.01); *H04R 5/027* (2013.01); *G10L 2015/088* (2013.01); *G10L 2021/02082* (2013.01)

(58) Field of Classification Search
CPC . G10L 2021/02166; G10L 2021/02082; G10L 2015/088; H04R 1/406; H04R 3/005; H04R 3/04; H04R 5/027
See application file for complete search history.

(56) References Cited

FOREIGN PATENT DOCUMENTS

| | | | |
|---|---|---|---|
| CN | 109272989 A | * | 1/2019 |
| CN | 109272989 A | | 1/2019 |
| JP | 04-273298 A | | 9/1992 |
| JP | 2000-148185 A | | 5/2000 |
| JP | 2016-080750 A | | 5/2016 |
| JP | 2016-524193 A | | 8/2016 |
| JP | 2016-536626 A | | 11/2016 |
| WO | 2014/156292 A1 | | 10/2014 |
| WO | 2018/151131 A1 | | 10/2015 |
| WO | 2017/053311 A1 | | 3/2017 |

OTHER PUBLICATIONS

Written Opinion of PCT/CN2019/085625 dated Jul. 24, 2019 [PCT/ISA/237].
Communication dated Nov. 8, 2021 in corresponding Japanese Application No. 2020-570624.

* cited by examiner

METHOD AND APPARATUS FOR SPEECH RECOGNITION, AND ELECTRONIC DEVICE

CROSS-REFERENCE TO RELATED APPLICATION(S)

This application is a continuation of PCT/CN2019/085625, filed on May 6, 2019, and claims priority to Chinese Patent Application No. 201810689667.5, entitled "METHOD AND DEVICE FOR SPEECH RECOGNITION, COMPUTER DEVICE, AND ELECTRONIC DEVICE," and filed on Jun. 28, 2018, which are incorporated herein by reference in their entireties.

BACKGROUND

1. Field

This disclosure relates to the field of speech interaction technologies, and in particular, to a speech recognition method and apparatus, a computer device, and an electronic device.

2. Description of Related Art

Intelligent speech interaction is a technology of implementing human-machine interaction by using a speech command. An electronic device may be implemented with a speech interaction technology to perform human to machine interaction. In addition, the intelligent electronic device is currently becoming increasingly popular among users.

Along with the increasing popularity, there is a need to improve accuracy of the speech recognition devices to enhance user experience. However, an environment in which the user uses speech recognition function in the electronic device is uncertain. When the user is in an environment with relatively large ambient noise, the speech recognition device may not be able to accurately detect user's command. Therefore, there is a need to reduce impact of the ambient noise during speech recognition to improve speech recognition accuracy of the electronic device.

In the related art, a method for resolving such a problem generally includes: first, collecting audio signals by using all microphones in a microphone array, determining sound source angles according to the collected audio signals, and performing directional collection on the audio signals according to the sound source angles. Therefore, interference from unrelated noises is reduced. However, this method is mainly dependent on precision of the sound source angles. When the sound source angles are incorrectly detected, speech recognition accuracy may be reduced.

SUMMARY

The disclosure provides a speech recognition method and apparatus, a computer device, and an electronic device, to solve a problem of low speech recognition accuracy.

According to an embodiment, there is provided a speech recognition method performed by an electronic device. The method including: receiving an audio signal obtained by a microphone array; performing a beamforming processing on the audio signal in a plurality of target directions to obtain a plurality of beam signals; performing a speech recognition on each of the plurality of beam signals to obtain a plurality of speech recognition results corresponding to the plurality of beam signals; and determining a speech recognition result of the audio signal based on the plurality of speech recognition results of the plurality of beam signals.

According to an embodiment, there is provided a speech recognition apparatus including: at least one memory storing computer program code; and at least one processor configured to access the at least one memory and operate as instructed by the computer program code. The computer program code includes audio signal receiving code configured to cause the at least one processor to receive an audio signal obtained by a microphone array; beamformer code configured to cause the at least one processor to respectively perform a beamforming processing on the audio signal in a plurality of target directions to obtain a plurality of beam signals; speech recognition code configured to cause the at least one processor to perform a speech recognition on each of the plurality of beam signals to obtain a plurality of speech recognition results corresponding to the plurality of beam signals; and processing code configured to cause the at least one processor to determine a speech recognition result of the audio signal based on the plurality of speech recognition results of the plurality of beam signals.

According to an embodiment, there is provided a non-transitory computer-readable storage medium storing programming code, said programming code configured to cause at least one processor to: receive an audio signal obtained by a microphone array; respectively perform a beamforming processing on the audio signal in a plurality of target directions to obtain a plurality of beam signals; perform a speech recognition on each of the plurality of beam signals to obtain a plurality of speech recognition results corresponding to the plurality of beam signals; and determine a speech recognition result of the audio signal based on the plurality of speech recognition results of the plurality of beam signals.

DETAILED DESCRIPTION

One or more aspects, features, and advantages of embodiments of the disclosure will become more apparent with the following descriptions of the embodiments described with reference to the accompanying drawings.

Figure 1:
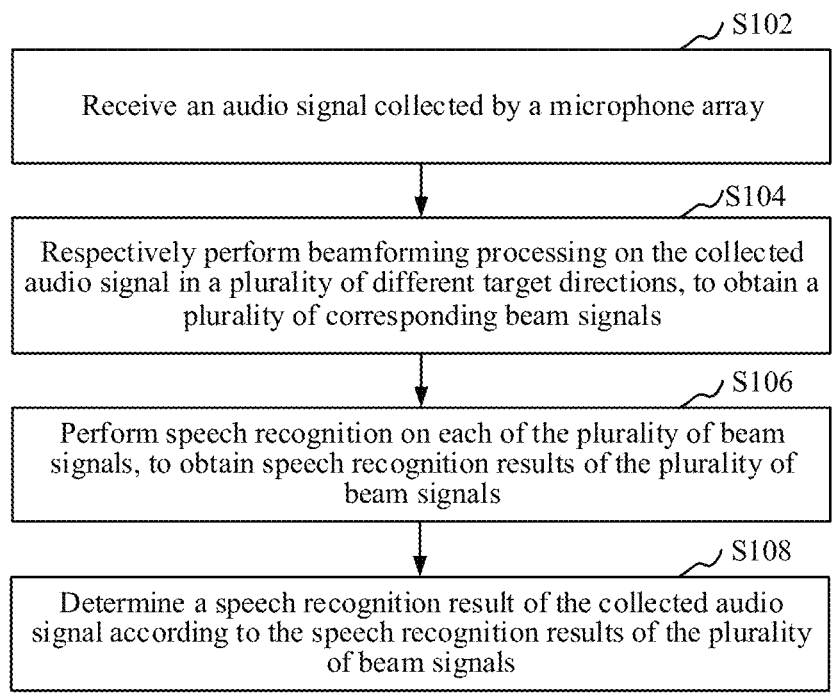
FIG. 1 is a flowchart of a speech recognition method according to an embodiment.

FIG. 1 is a flowchart of a speech recognition method according to an embodiment. This embodiment is described using an example in which the method is applied to a speech recognition device. The speech recognition device may be an electronic device into which a speech interaction technology is embedded. The electronic device may be an intelligent terminal, an intelligent household appliance, a robot, or the like, capable of implementing human-machine interaction. As shown in FIG. 1, the speech recognition method includes the following steps.

In S102, the method may include receiving an audio signal collected by a microphone array.

The microphone array may refer to an arrangement of microphones, and is formed by a specific quantity of microphones. Each microphone collects an analog signal of an environmental sound, and converts the analog signal into a digital audio signal by using an audio collection device such as an analog-to-digital converter, a gain controller, or a codec.

Microphone arrays arranged in different manners have different audio signal collection effects.

For example, a one-dimensional microphone array may be used as the microphone array. Here, the center of array elements of the one-dimensional microphone array may be located on the same straight line. The one-dimensional microphone array may be further classified into a uniform linear array (ULA) and a nested linear array according to distances between adjacent array elements being equal. The ULA is the simplest array topology structure. The distances between array elements of the ULA are equal, phases of the array elements are the same, and sensitivity of the array elements is the same. The nested linear array may be regarded as an overlap of several groups of ULAs, and is a special type of non-uniform array. Such a linear microphone array may not distinguish sound source directions within the entire 360-degree range in a horizontal direction, and may only distinguish sound source directions within a 180-degree range. Such a linear microphone array may be applied to an application environment of the 180-degree range. For example, the speech recognition device may be placed against a wall. Alternatively, the speech recognition device may be located in an environment in which a sound source has a 180-degree range.

As another example, a two-dimensional microphone array, that is, a planar microphone array may be used as the microphone array. Centers of array elements of the two-dimensional microphone array are distributed on a plane. The two-dimensional microphone array may be classified into an equilateral triangular array, a T-shaped array, a uniform circular array, a uniform square array, a coaxial circular array, a circular or rectangular planar array, and the like, according to a geometrical shape of the array. The planar microphone array may obtain information about a horizontal azimuth and a vertical azimuth of an audio signal. Such a planar microphone array may be applied to an application environment of the 360-degree range. For example, the speech recognition device needs to receive sounds from all directions on a plane.

As yet another example, a three-dimensional microphone array, that is, a stereoscopic microphone array may be used as the microphone array. Centers of array elements of the three-dimensional microphone array are distributed in a stereoscopic space. The three-dimensional microphone array may be classified into a tetrahedral array, a cubic array, a cuboid array, a spherical array, and the like according to a stereoscopic shape of the array. The stereoscopic microphone array may obtain three types of information about a horizontal azimuth and a vertical azimuth of a signal, and a distance between a sound source and a microphone array reference point.

Figure 2:
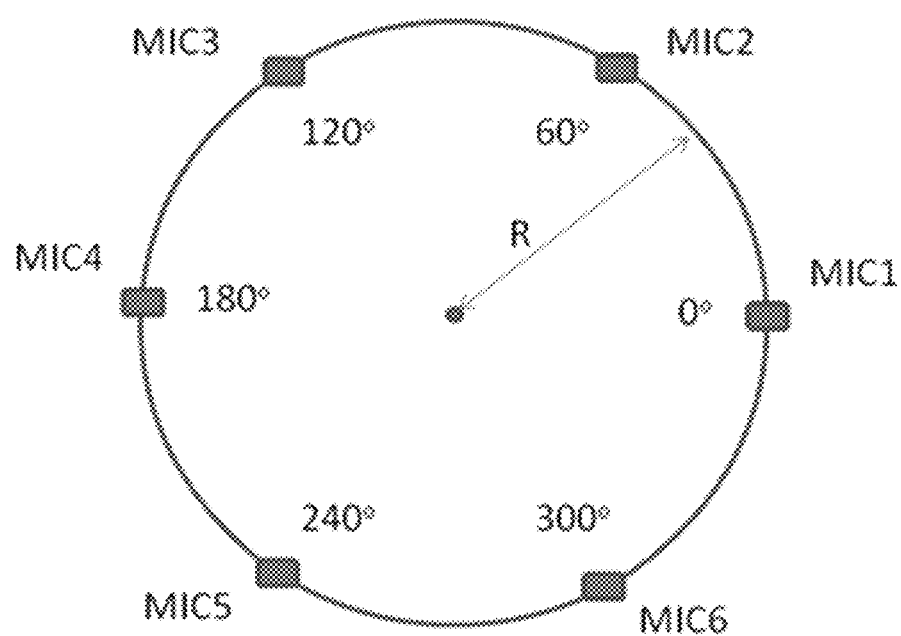
FIG. 2 is a schematic diagram of a microphone array according to an embodiment.

For example, the microphone array may be an annular microphone array. In FIG. 2, an example of the annular microphone array is shown. Here, 6 physical microphones are used, and are sequentially mounted on a 0-degree azimuth, a 60-degree azimuth, a 120-degree azimuth, a 180-degree azimuth, a 240-degree azimuth, and a 300-degree azimuth on a circumference, in which the radius is R. The 6 physical microphones form one annular microphone array. Each microphone may obtain an analog signal of an environmental sound, and convert the analog signal into a digital audio signal by using an audio collection device such as an analog-to-digital converter, a gain controller, or a codec. The annular microphone array may obtain sound signals in 360 degrees.

In S104, the method may include performing a beamforming processing on the obtained audio signal in a plurality of different target directions, respectively, to obtain a plurality of corresponding beam signals.

Beamforming is used to perform latency or phase compensation, or amplitude-weighting processing on audio signals outputted by microphones in a microphone array, to form beams pointing to specific directions. For example, beamforming may be performed on the audio signal obtained by the microphone array in a 0-degree direction, a 90-degree direction, a 180-degree direction, or a 270-degree direction, to form a beam pointing to the 0-degree direction, the 90-degree direction, the 180-degree direction, or the 270-degree direction.

In an example, a beamformer may be used for respectively performing beamforming processing on the audio signal in set directions. The beamformer may be an algorithm designed based on a specific microphone array, and may enhance audio signals from one or more specific target directions and suppress audio signals from other directions. The beamformer may be any type of beamformer capable of setting directions, and include, but is not limited to, a superdirective beamformer and a beamformer based on a minimum variance distortionless response (MVDR) algorithm or a multiple signal classification (MUSIC) algorithm.

In this embodiment, a plurality of beamformers are disposed, and the beamformers perform beamforming processing in different directions. In an example, digital audio signals of a plurality of microphones form a microphone array signal to be transmitted to a plurality of beamformers. The beamformers perform enhancement processing on audio signals in different set directions, and suppress audio signals in the other directions. The further the audio signals deviate from the set direction, the more the audio signals are suppressed. As such, audio signals near the set direction may be extracted.

Figure 3:
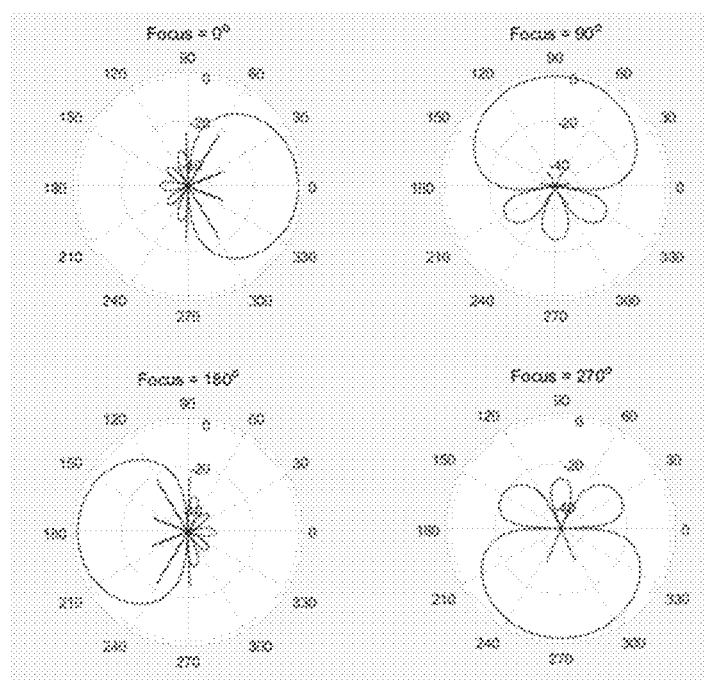
FIG. 3 is a schematic diagram of beam signals obtained by performing beamforming processing in four target directions according to an embodiment.

FIG. 3 is a schematic diagram of a plurality of beam signals obtained by performing beamforming processing on audio signals in a plurality of directions according to an embodiment. In this embodiment, four beamformers are disposed, and respectively perform beamforming processing on audio signals in a 0-degree direction, a 90-degree direction, a 180-degree direction, and a 270-degree direction. It may be understood that, for audio signals inputted into the beamformers, an arrangement manner of a microphone array collecting the audio signals is not limited. By respectively performing beamforming processing in a plurality of target directions, enhancement processing can be performed on audio signals in the target directions, and interference from audio signals in other directions may be reduced. Therefore, in an example, the microphone array collecting the audio signals have at least two microphones in different directions.

An example in which audio signals are collected by using the microphone array shown in FIG. 2 is used. As shown in FIG. 3, digital audio signals of a plurality of microphones form a microphone array signal. A sound in a 0-degree direction remains unchanged (a gain of 0 dB), suppression greater than 9 dB (a gain of about −9 dB) is performed on sounds in a 60-degree direction and a 330-degree direction, and suppression greater than 20 dB is performed on sounds in a 90-degree direction and a 270-degree direction. A shorter distance between a line and a center of a circle indicates more suppression on a sound in the direction, thereby enhancing an audio signal in the 0-degree direction and reducing interference from audio signals in other directions.

As another example, a sound in a 90-degree direction remains unchanged (a gain of 0 dB), suppression greater than 9 dB (a gain of about −9 dB) is performed on sounds in a 30-degree direction and a 150-degree direction, and suppression greater than 20 dB is performed on sounds in a 0-degree direction and a 180-degree direction. A shorter distance between a line and a center of a circle indicates more suppression on a sound in the direction, thereby enhancing an audio signal in the 90-degree direction and reducing interference from audio signals in other directions.

As yet another example, a sound in a 180-degree direction is unchanged (a 0 dB gain), suppression greater than 9 dB (about a −9 dB gain) is performed on sound in a 120-degree direction and a 240-degree direction, and suppression greater than 20 dB is performed on sound in a 90-degree direction and a 270-degree direction. A shorter distance between a line and a center of a circle indicates more suppression on a sound in the direction, thereby enhancing an audio signal in the 180-degree direction and reducing interference from audio signals in other directions.

Lastly, a sound in a 270-degree direction is unchanged (a 0 dB gain), suppression greater than 9 dB (about a −9 dB gain) is performed on sound in a 210-degree direction and a 330-degree direction, and suppression greater than 20 dB is performed on sound in a 180-degree direction and a 0-degree direction. A shorter distance between a line and a center of a circle indicates more suppression on a sound in the direction, thereby enhancing an audio signal in the 270-degree direction and reducing interference from audio signals in other directions.

It may be understood that, to enhance audio signals in other target directions, in other embodiments, more or fewer beamformers may be further disposed, to extract beam signals in other directions. By respectively performing beamforming processing in a plurality of different target directions that are set, for beam signals of the beamformers, audio signals in the target directions may be enhanced, and interference from audio signals in other directions may be reduced. In a plurality of audio signals in the target directions, there is at least one beam signal close to an actual sound direction, that is, there is at least one beam signal that may reflect an actual sound, and interference from noises in other directions may be reduced accordingly.

In this embodiment, for audio signals collected by a microphone array, sound source directions do not need to be identified, and beamforming processing is performed on all the audio signals in a plurality of different target directions that are set. The advantage of such processing is that, beam signals in the plurality of target directions can be obtained, and based on the beam signals received from the plurality of target directions, there is definitely at least one beam signal close to an actual sound direction, that is, at least one beam signal can reflect an actual sound. For a beamformer in the direction, enhancement processing is performed on an audio signal in the direction, and suppression processing is performed on audio signals in other directions, so that the audio signal at an angle corresponding to the actual sound direction can be enhanced. That is, audio signals in other directions are reduced, so that the audio signal in the direction can be clearly extracted, and interference from the audio signals (including noises) in other directions is reduced.

Referring back to FIG. 2, in S106, the method may include performing speech recognition on each of the plurality of beam signals to obtain speech recognition results of the plurality of beam signals.

Here, speech recognition is performed on each of the plurality of beam signals. Because the plurality of beam signals are obtained by performing beamforming processing on the audio signal in the plurality of different target directions that are set, that is, one beam signal is obtained by performing enhancement processing on the audio signal from a set target direction and performing suppression processing on audio signals for other directions aside from the set target direction. Therefore, the beam signals may reflect sound enhancement signals of audio signals in different directions, and for the sound enhancement signals including human voices, speech recognition accuracy can be improved by performing speech recognition on the beam signals in all the directions.

In S108, the method may include determining a speech recognition result of the collected audio signal according to the speech recognition results of the plurality of beam signals.

By performing speech recognition on each of the plurality of beam signals, speech recognition accuracy of an audio signal in a corresponding direction can be improved, and speech recognition results of audio signals coming from a plurality of directions can be obtained according to the speech recognition results of the plurality of beam signals in the directions. That is, a speech recognition result of the obtained audio signal may be determined with reference to the speech recognition results obtained after sounds in all the directions are enhanced.

In the speech recognition method, by performing beamforming processing on an audio signal collected by a microphone array in a plurality of different target directions, a plurality of corresponding beam signals may be obtained. Furthermore, after sound enhancement processing is respectively performed in different target directions, beam signals may be obtained after enhancement processing is performed in the target directions to extract more accurate and higher-quality audio signals. That is, even if sound source directions are not initially established, by performing beamforming processing in different target directions, at least one target direction that is close to an actual sound generating direction may be determined. Therefore, at least one beam signal enhanced in a target direction is clear, thereby improving speech recognition accuracy when speech recognition is performed according to all beam signals.

In addition, the performing speech recognition on each of the plurality of beam signals to obtain speech recognition results of the plurality of beam signals may include respectively inputting the plurality of beam signals into corresponding speech recognition models, and performing speech recognition on the corresponding beam signals by using the speech recognition models in parallel to obtain the speech recognition results of the plurality of beam signals.

According to an embodiment, the speech recognition models may be pre-trained by using neural network models. Feature vectors corresponding to the plurality of beam signals, such as energy and sub-band features, are calculated by using pre-trained neural network parameters layer by layer to perform speech recognition.

In another embodiment, a number of speech recognition models may correspond a quantity of beamformers disposed, that is, one beamformer corresponds to one speech recognition model.

Figure 4:
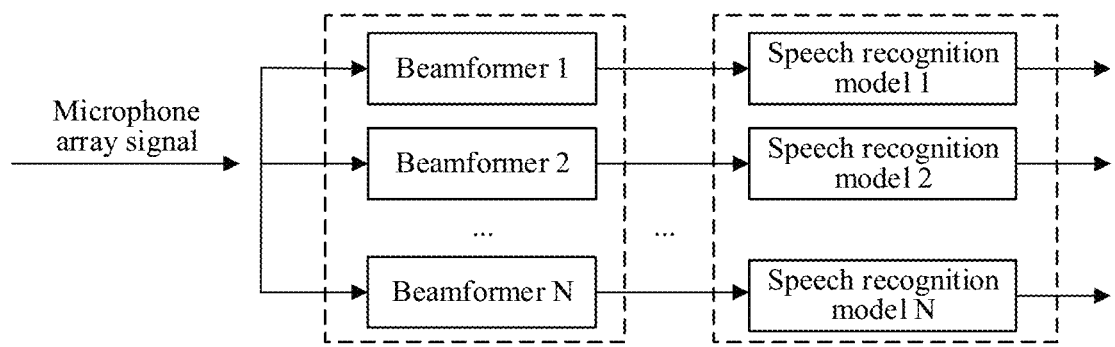
FIG. 4 is a schematic diagram of interaction between a beamformer and a speech recognition model according to an embodiment.

FIG. 4 is a schematic diagram of interaction between a beamformer and a speech recognition model according to an embodiment. For example, the plurality of beam signals are respectively inputted into corresponding speech recognition models, and speech recognition is performed on the inputted beam signals by using the corresponding speech recognition models in parallel to obtain the speech recognition results of the plurality of beam signals.

In this embodiment, a number of speech recognition models may correspond to a quantity of beamformers disposed to perform speech recognition on the plurality of beam signals in parallel, which can improve efficiency of speech recognition.

Specifically, one beamformer and one speech recognition model may be paired to run on a central processing unit (CPU) or a digital signal processor (DSP). In addition, beamformers and speech recognition models may be paired to run on a plurality of CPUs, and then speech recognition results of the speech recognition models may be combined to obtain a final speech recognition result. The processing speed may be greatly increased by using such parallel calculation.

In this embodiment, different hardware calculating units are used for processing to share the calculation results, thereby improving system stability, and increasing the response speed of speech recognition. In an example, N beamformers are divided into M groups of beamformers, where M≤N. In each group of beamformers, calculation is performed by using a designated hardware calculating unit (for example, a DSP or a CPU core). Similarly, N speech recognition models are divided into M groups of speech recognition models, where M≤N. In each group of speech recognition models, calculation is performed by using a designated hardware calculating unit (for example, a DSP or a CPU core).

The speech recognition method according to the embodiments of the disclosure may include keyword detection (for example, spoken keyword spotting or spoken term detection).

The keyword detection is a sub-field in the speech recognition. An objective of the keyword detection is to detect all appearing locations of a designated word in an audio signal. In an embodiment, a keyword detection method may be applied to the field of wakeup word detection. A wakeup word refers to a set speech instruction. When a wakeup word is detected, a speech recognition device in a dormant state or a lock screen state enters an instruction waiting state.

The speech recognition result may include a keyword detection result. That is, a speech recognition result of the collected audio signal according to the plurality of beam signals may further include: determining a keyword in the collected audio signal and generating a keyword detection result of the plurality of beam signals.

The speech recognition models receive beam signals outputted by corresponding beamformers, detect whether the beam signals include a keyword, and output a detection result. That is, the speech recognition models are configured to detect, according to the beam signals received in all directions, whether audio signals coming from all the directions include a keyword.

Figure 5:
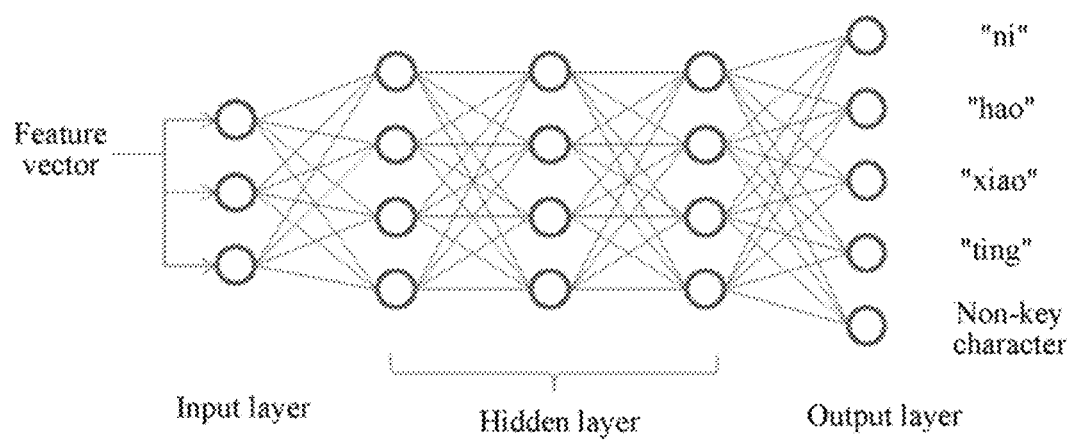
FIG. 5 is a schematic structural diagram of a speech recognition model according to an embodiment.

FIG. 5 is a schematic structural diagram of a speech recognition model according to an embodiment. Here, an example in which the keyword includes 4 characters is used. As shown in FIG. 5, feature vectors of the beam signals (such as energy and sub-band features) are calculated by using pre-trained network parameters layer by layer to obtain output values of all nodes, and a keyword detection result is finally obtained at an output layer.

In an embodiment, the detection result may be a binary symbol. For example, an output of 0 may indicate that a keyword is not detected, and an output of 1 may indicate that a keyword is detected. The method of detecting a keyword in the collected audio signal according to the plurality of beam signals may include, based on a keyword being detected in any of the plurality of beam signals, determining that the keyword detection result of the collected audio signal is that a keyword is detected. In other words, in a case that at least one of a plurality of speech recognition models detects a keyword, the keyword detection result shows that a keyword is detected.

In addition, the keyword detection result may further include a keyword detection probability. The keyword detection in the collected audio signal may further include determining, in a case that a keyword detection probability of at least one beam signal is greater than a preset value, that the keyword detection result of the collected audio signal is that a keyword is detected.

Figure 6:
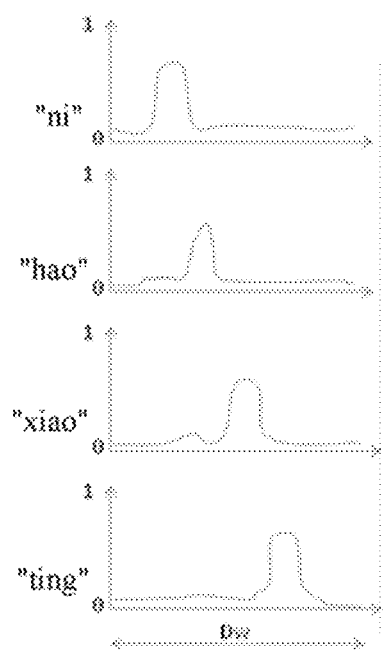
FIG. 6 is a schematic diagram of a signal when a neural network node of a speech recognition model detects a wakeup word according to an embodiment.

As shown in FIG. 5, it is assumed that, a keyword is "ni hao xiao ting", and the output layer of the neural network has 5 nodes, respectively representing probabilities that a segment of speech belongs to four key characters of "ni", "hao", "xiao", and "ting", and a non-key character. If a wakeup word is detected in a time window Dw (shown in FIG. 6), it appears at output nodes of the neural network. Referring to FIG. 6, it may be observed that probabilities of the four key characters of "ni", "hao", "xiao", and "ting", respectively increase with respect to Dw. By accumulating probabilities of the four key characters in the wakeup word in the time window Dw, it may be determined whether a keyword appears.

In an embodiment, the determining the keyword detection result of the collected audio signal according to the keyword detection results of the plurality of beam signals may include inputting keyword detection probabilities of the plurality of beam signals into a pre-trained classifier, and determining whether the collected audio signal includes a keyword according to an output of the classifier.

The speech recognition models output probabilities that a wakeup word appears in all directions, and a classifier is used for performing final detection determination. The classifier includes, but is not limited to, various classification algorithms such as a neural network, a support vector machine (SVM), and a decision tree. The classifier may also referred to as a post-processing logic module in this embodiment.

Furthermore, the determining the speech recognition result of the collected audio signal according to the speech recognition results of the plurality of beam signals may include obtaining linguistic scores and/or acoustic scores of the speech recognition results of the plurality of beam signals, and determining a speech recognition result having the highest score as the speech recognition result of the collected audio signal.

The speech recognition method may be applied to a continuous or non-continuous speech recognition field. Outputs of a plurality of beamformers may be simultaneously fed into a plurality of speech recognition models, and an output of one of the plurality of speech recognition models that has the best speech recognition effect may be used as a final speech recognition result. In an example, the final speech recognition result may be a speech recognition result having the highest acoustic score or linguistic score, or a speech recognition result having the highest acoustic score and linguistic score.

In another embodiment, the speech recognition method may further include performing suppression processing on an echo caused by an audio signal outputted by a speech recognition device.

Figure 7:
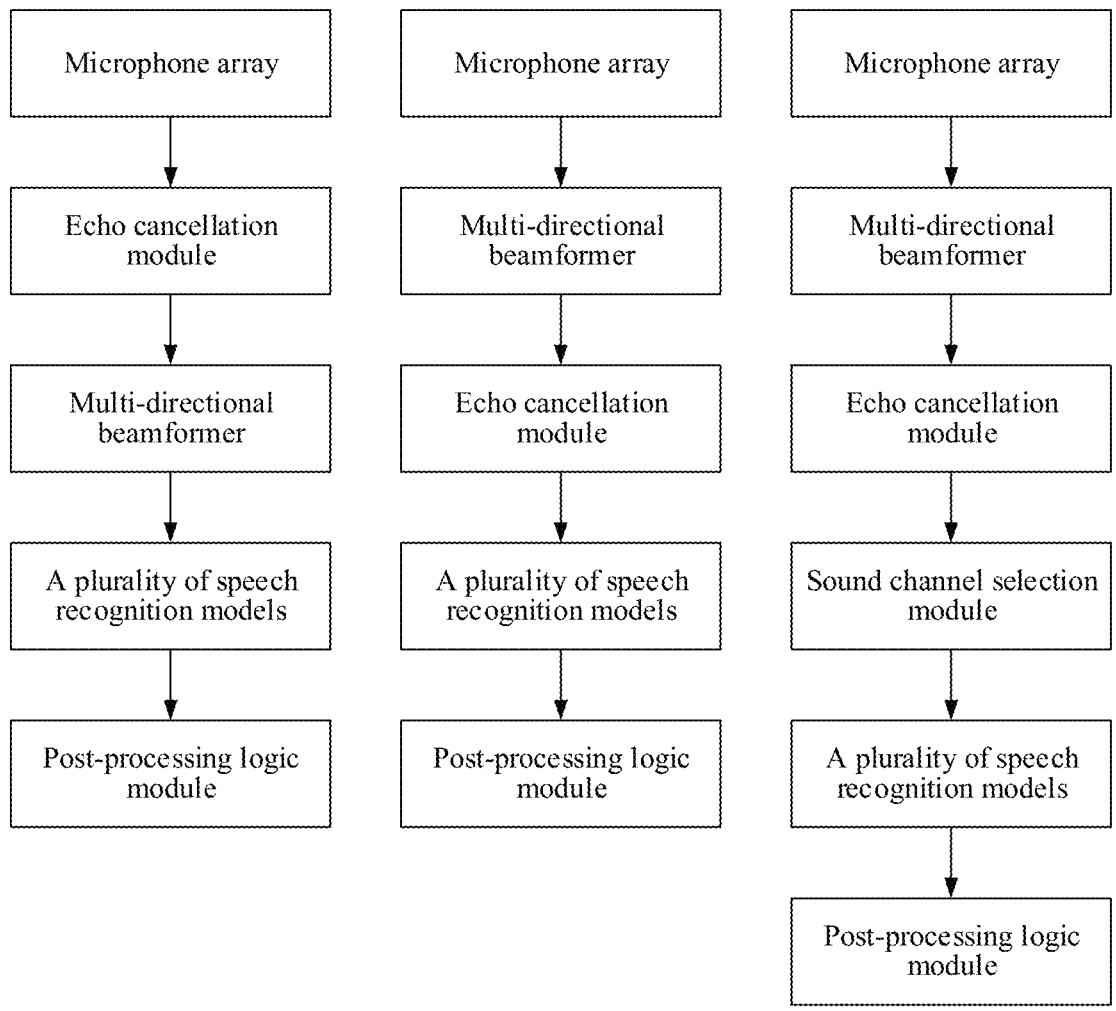
FIG. 7 is an architectural diagram of speech recognition according to an embodiment.

For a speech recognition device, such as a smart speaker, including an audio playing function, to avoid interference from a sound played by the speech recognition device to the speech recognition, referring to FIG. 7, an echo cancellation module is further disposed in an embodiment. The echo cancellation module may remove an echo that is collected by a microphone due to the speech recognition device playing an audio. As shown in FIG. 7, the echo cancellation module may be placed before or behind a multi-directional beamformer. In an example, when a quantity of sound channels to which a multi-directional beamformer outputs a sound is less than a quantity of microphones, the calculation amount may be effectively reduced by placing the echo cancellation module behind the multi-directional beamformer.

In an embodiment, as shown in FIG. 7, a plurality of output signals of the echo cancellation module or the beamformer may pass through one sound channel selection module, to further reduce a quantity of output sound channels, thereby reducing the calculation amount and memory consumption of a plurality of subsequent speech recognition modules.

Using wakeup word detection as an example, a plurality of beam signals outputted by a multi-directional beamformer may be transmitted to a plurality of speech recognition models for performing wakeup word detection. After obtaining a plurality of wakeup word detection results by performing wakeup word detection, the plurality of speech recognition models output the plurality of wakeup word detection results to a post-processing logic module for final determination. Here, the post-processing logic module may determine whether a wakeup word appears in a current acoustic scene.

In an embodiment, an electronic device may include a microphone array configured to collect an audio signal, the microphone array including at least two annular structures. The electronic device may include a processor connected to the microphone array and configured to process an audio signal. The electronic device may include a memory storing a computer program and a housing encapsulating the microphone array. The computer program, when executed by the processor, may cause the processor to perform the speech recognition method according to the foregoing embodiments.

When the microphone array is an annular array, microphones in the annular array may be mounted on a standard circumference, or may be mounted on an elliptical circumference. The microphones may be uniformly distributed on the circumference, or may be non-uniformly distributed on the circumference. A microphone array with an annular structure can collect audio signals in 360 degrees, thereby increasing directions of sound source detection, which is applicable to a far-field environment.

In an embodiment, at least three microphones may be disposed on each annular structure. That is, three or more microphones may be mounted on each annular structure to form a multi-layer annular array. Theoretically, more microphones on the annular array indicate higher precision of calculating sound source directions and better enhancement quality of sounds in target directions. Given that more microphones indicate higher costs and computational complexity, 4 to 8 microphones may be disposed on each annular structure.

In an embodiment, microphones on each annular structure may uniformly disposed to reduce complexity of sound detection.

In an embodiment, the annular structures may be concentric circles, and microphones on two adjacent annular structures are respectively disposed in the same directions. That is, the microphones on the annular structure are respectively disposed at the same angles.

Figure 8:
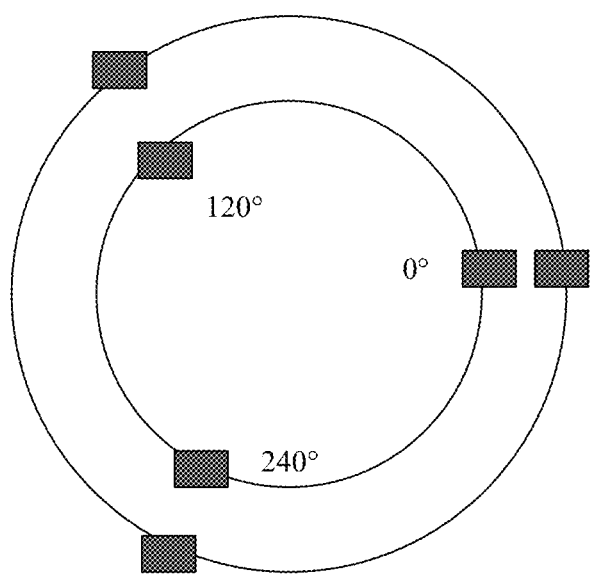
FIG. 8 is a schematic diagram of a microphone array according to an embodiment.

FIG. 8 is a schematic diagram of a microphone array according to an embodiment. As shown in FIG. 8, using two annular structures as an example, three microphones are disposed on each annular structure. Inner microphones and outer microphones are respectively disposed at a 0-degree direction, a 120-degree direction, and a 240-degree direction. A quantity of microphones in the microphone array with the multi-layer annular structure may be increased so that the array may achieve better directionality.

Figure 9:
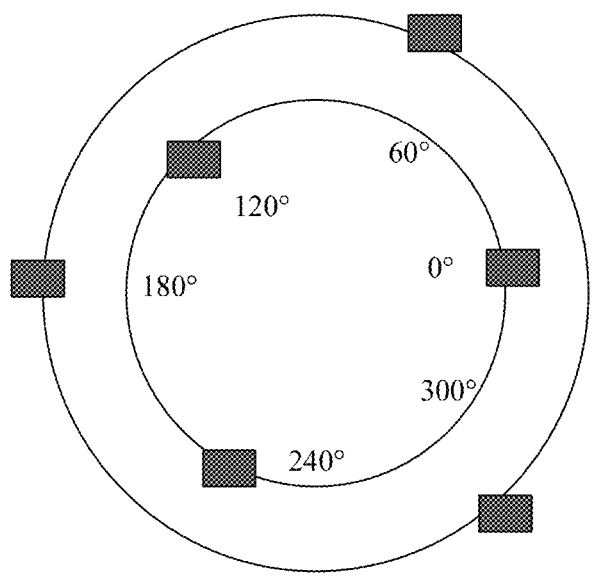
FIG. 9 is a schematic diagram of a microphone array according to another embodiment.

In another embodiment, there may be an angle between microphones on any two annular structures. That is, microphones on annular structures are staggered. As shown in FIG. 9, using two annular structures as an example, three microphones are disposed on each annular structure. On an inner annular structure, microphones are respectively disposed in a 0-degree direction, a 120-degree direction, and a 240-degree direction. On an outer annular structure, microphones are respectively disposed at a 60-degree direction, a 180-degree direction, and a 300-degree direction. In such a microphone array, relative locations of microphones may be more diversified. For example, inner microphones and outer microphones may have different angles between each other so that sound sources in some directions are better detected and enhanced. The denser the distribution of microphones in the structure, the higher the spatial sampling, and sound signals on some frequencies may be better detected and enhanced.

In another embodiment, an additional microphone may be mounted at a center of a circle of an annular array to form a microphone array. By placing an additional microphone at the center of the circle, the directionality of the array may be improved. For example, the microphone in the center of the circle may be combined with any microphone on the circumference of the annular structure to form a linear array having two microphones, facilitating detection of sound source directions. The microphone in the center of the circle may alternatively be combined with a plurality of microphones on the circumference to form microphone sub-arrays with different shapes, facilitating detection of signals in different directions or on different frequencies.

The speech recognition method according to the embodiments of the disclosure may be applied to keyword detection, for example, wakeup word detection, or any continuous or non-continuous speech recognition field. The speech recognition method is described below by using an example in which the speech recognition method is applied to wakeup word detection.

Figure 10:
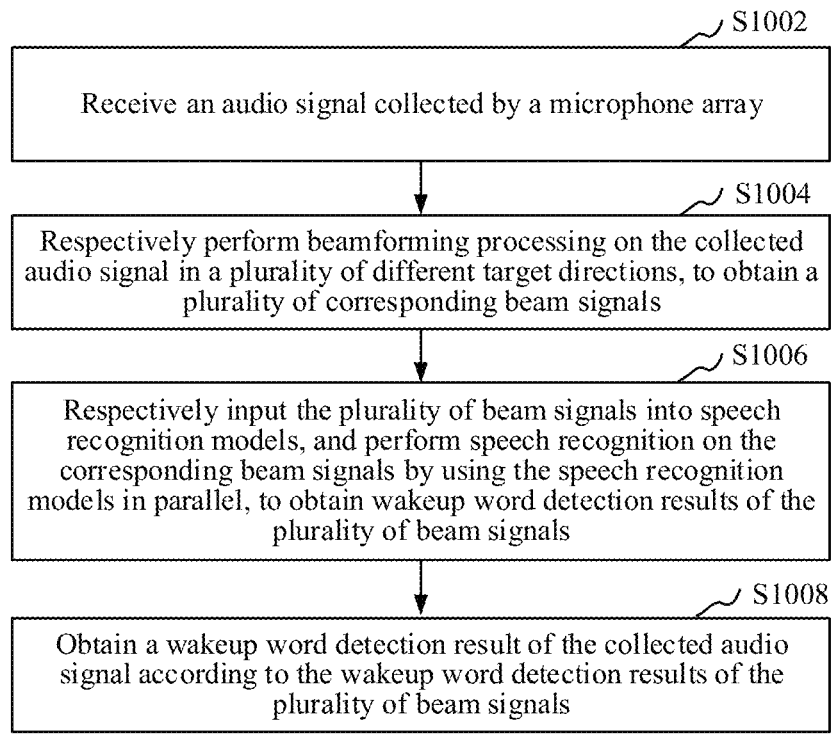
FIG. 10 is a flowchart of a speech recognition method according to an embodiment.

FIG. 10 is a flowchart of a speech recognition method according to an embodiment. The speech recognition method may include includes the following steps.

In S1002, the method may include receiving an audio signal collected by a microphone array.

Here, an arrangement of the microphone array is not limited. For example, when an electronic device is placed against a wall, or the electronic device is located in an environment in which a sound source may be only detected in a 180-degree range, the microphone array may be arranged linearly. As another example, when the electronic device needs to receive sounds from all directions, that is, in a 360-degree range, an annular microphone array may be used as the microphone array. Examples of arrangement manners of an annular microphone array are respectively shown in FIG. 2, FIG. 8, and FIG. 9. Each microphone collects an analog signal of an environmental sound, and converts the analog signal into a digital audio signal by using an audio collection device such as an analog-to-digital converter, a gain controller, or a codec.

In S1004, the method may include respectively performing beamforming processing on the collected audio signal in a plurality of different target directions to obtain a plurality of corresponding beam signals.

In S1006, the method may include respectively inputting the plurality of beam signals into speech recognition models, and performing speech recognition on the corresponding beam signals by using the speech recognition models in parallel to obtain wakeup word detection results of the plurality of beam signals.

In this embodiment, a number of speech recognition models may correspond to a quantity of beamformers disposed, to perform speech recognition on the plurality of beam signals in parallel, thereby improving the efficiency of wakeup word detection.

Referring back to FIG. 5, a structure of a speech recognition model is shown according to an embodiment. The speech recognition models receive beam signals outputted by corresponding beamformers, detect whether the beam signals include a wakeup word signal, and output a detection result. An example in which the wakeup word includes 4 characters is used. As shown in FIG. 5, feature vectors of the beam signals (such as energy and sub-band features) are calculated by using pre-trained network parameters layer by layer to obtain output values of all nodes, and the wakeup word or probabilities of key characters in the wakeup word are finally obtained at an output layer. As shown in FIG. 5, it is assumed that, a wakeup word is "ni hao xiao ting", and the output layer of the neural network has 5 nodes, respectively representing probabilities that a segment of speech belongs to four key characters of "ni", "hao", "xiao", and "ting", and a non-key character.

In S1008, the method may include obtaining a wakeup word detection result of the collected audio signal according to the plurality of beam signals.

The wakeup word detection result may be a binary symbol (for example, outputting 0 indicates that a wakeup word is not detected, and outputting 1 indicates that a wakeup word is detected), or may be an output probability (for example, a larger probability value indicates that a wakeup word is detected). If outputs of the speech recognition models are probabilities that a wakeup word may appear, when an output probability of at least one speech recognition model is greater than a preset value, it is considered that a wakeup word is detected. Alternatively, the speech recognition models may output probabilities that a wakeup word may appear in all directions, and a classifier may be used for performing final detection determination. That is, wakeup word detection probabilities of the plurality of beam signals are inputted into the classifier, and whether the collected audio signal includes a wakeup word is determined according to an output of the classifier.

In the foregoing method, an audio signal is collected by using a microphone array, and filtering is performed on a microphone array signal by using a multi-directional beamformer to form a plurality of directional enhancement signals. In addition, a wakeup word in the directional enhancement signals is monitored by using a plurality of speech recognition models, and a final determination result is obtained by combining wakeup word detection results outputted by the plurality of speech recognition models. In this method, sound source directions do not need to be initially determined, and by performing beamforming processing in different target directions, at least one target direction that is close to an actual sound generating direction may be determined. Therefore, at least one beam signal enhanced in a target direction is clear, so that accuracy of wakeup word detection in the direction can be improved when wakeup word detection is performed according to all beam signals.

Figure 11:
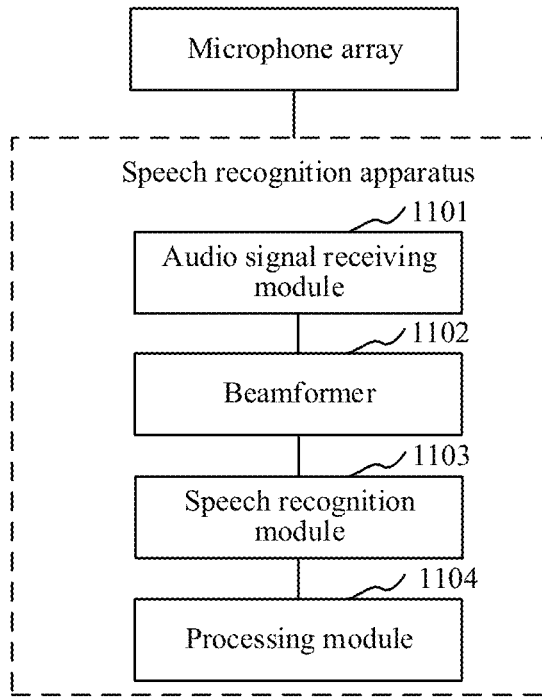
FIG. 11 is a structural block diagram of a speech recognition apparatus according to an embodiment.

FIG. 11 is a structural block diagram of a speech recognition apparatus according to an embodiment. The speech recognition apparatus may include an audio signal receiving module 1101 configured to receive an audio signal collected by a microphone array; a beamformer 1102 configured to respectively perform beamforming processing on the audio signal in a plurality of different target directions to obtain a plurality of corresponding beam signals; a speech recognition module 1103 configured to perform speech recognition on each of the plurality of beam signals to obtain speech recognition results of the plurality of beam signals; and a processing module 1104 configured to determine a speech recognition result of the audio signal according to the speech recognition results of the plurality of beam signals.

In the speech recognition apparatus, by performing beamforming processing on an audio signal collected by a microphone array in a plurality of different target directions, a plurality of corresponding beam signals may be obtained, so that sound enhancement processing is respectively performed in different target directions, and beam signals obtained after enhancement processing is performed in the target directions can be clearly extracted. That is, in the apparatus, sound source directions do not need to be initially determined, and by performing beamforming processing in different target directions, at least one target direction is close to an actual sound generating direction. Therefore, at least one beam signal enhanced in a target direction is clear, thereby improving speech recognition accuracy when speech recognition is performed according to all beam signals.

According to an embodiment, the processing module 1104 is configured to determine a keyword detection result of the audio signal according to the plurality of beam signals.

The processing module is configured to, based on a keyword being detected in any one of the plurality of beam signals, determine that the keyword is detected in the audio signal.

The keyword detection result may include a keyword detection probability. The processing module is configured to determine, in a case that a keyword detection probability of at least one beam signal is greater than a preset value, that the keyword is detected in the audio signal.

The processing module is configured to input keyword detection probabilities of the plurality of beam signals into a classifier, and determine whether the audio signal includes a keyword according to an output of the classifier.

In an embodiment, the processing module is configured to calculate linguistic scores and/or acoustic scores of the speech recognition results of the plurality of beam signals, and determine a speech recognition result having the highest score as the speech recognition result of the audio signal.

In an embodiment, the speech recognition module is configured to respectively input the plurality of beam signals into corresponding speech recognition models, and perform speech recognition on the corresponding beam signals by using the speech recognition models in parallel, to obtain the speech recognition results of the plurality of beam signals.

As shown in FIG. 4, one beamformer may correspond to one speech recognition model. The speech recognition module is configured to respectively input the plurality of beam signals into corresponding speech recognition models, and perform speech recognition on the corresponding beam signals by using the speech recognition models in parallel, to obtain the speech recognition results of the plurality of beam signals.

In an embodiment, the speech recognition apparatus may further include an echo cancellation module that is configured to perform suppression processing on an echo of an audio signal outputted by a speech recognition device.

The speech recognition apparatus may further include a sound channel selection module. A plurality of output signals of the echo cancellation module or the beamformer may pass through one sound channel selection module, to further reduce a quantity of output sound channels, so as to reduce the calculation amount and memory consumption of a plurality of subsequent speech recognition modules.

Figure 12:
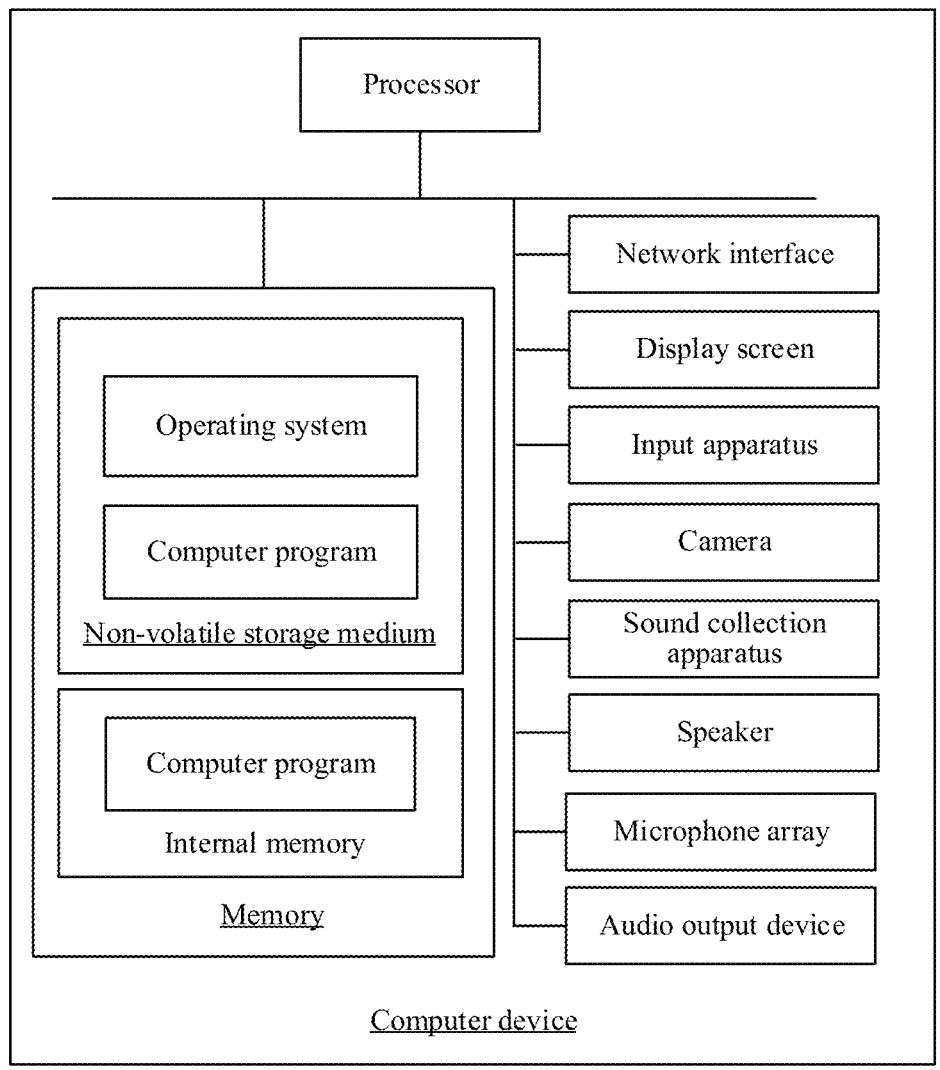
FIG. 12 is a structural block diagram of a computer device according to an embodiment.

FIG. 12 is a diagram of an internal structure of a computer device according to an embodiment. The computer device may be a speech recognition device. As shown in FIG. 12, the computer device may include a processor, a memory, a network interface, an input apparatus, a display screen, a microphone array, and an audio output device that are connected by a system bus. The microphone array collects audio signals. The memory includes a non-volatile storage medium and an internal memory. The non-volatile storage medium of the computer device stores an operating system and may further store a computer program, the computer program, when executed by the processor, causes the processor to implement a speech recognition method according to the embodiments of the disclosure.

The internal memory may also store a computer program, the computer program, when executed by the processor, causes the processor to perform the speech recognition method according to the embodiments of the disclosure. The display screen of the computer device may be a liquid crystal display screen or an electronic ink display screen. The input apparatus of the computer device may be a touch layer covering the display screen, or may be a key, a trackball or a touchpad disposed on a housing of the computer device, or may be an external keyboard, touchpad, mouse, or the like. The audio output device includes a speaker, configured to play a sound.

A person skilled in the art may understand that the structure shown in FIG. 12 is merely a block diagram of a part of the structure related to the embodiments of the disclosure, and does not constitute a limitation on a computer device to which the embodiments are applied. In particular, the computer device may include more or fewer components than those shown in the figure, or combine some components, or have different component arrangements.

In an embodiment, the speech recognition apparatus may be implemented in a form of a computer program. The computer program may be run on the computer device shown in FIG. 12. The memory of the computer device may store program modules forming the speech recognition apparatus, for example, the audio signal receiving module, the beamformer, and the speech recognition module that are shown in FIG. 11. The computer program formed by the program modules causes the processor to perform the steps in the speech recognition method in the embodiments described herein.

For example, the computer device shown in FIG. 12 may perform, by using the audio signal receiving module in the speech recognition apparatus shown in FIG. 11, the step of receiving an audio signal collected by a microphone array. The computer device may perform, by using the beamformer, the step of respectively performing beamforming processing on the audio signal in a plurality of different target directions that are set, to obtain a plurality of corresponding beam signals. The computer device may perform, by using the speech recognition module, the step of performing speech recognition according to the plurality of beam signals.

A computer device includes a memory and a processor, the memory storing a computer program, and the computer program, when executed by the processor, causing the processor to perform the following operations: receiving an audio signal collected by a microphone array; respectively performing beamforming processing on the audio signal in a plurality of different target directions, to obtain a plurality of corresponding beam signals; performing speech recognition on each of the plurality of beam signals, to obtain speech recognition results of the plurality of beam signals; and determining a speech recognition result of the audio signal according to the speech recognition results of the plurality of beam signals.

In an embodiment, the speech recognition result includes a keyword detection result, and the determining the speech recognition result of the audio signal according to the plurality of beam signals includes: determining a keyword detection result of the audio signal according to keyword detection results of the plurality of beam signals.

In an embodiment, the determining the keyword detection result of the audio signal according to the keyword detection results of the plurality of beam signals includes determining, in a case that a keyword detection result of any beam signal is that a keyword is detected, that the keyword detection result of the audio signal is that a keyword is detected.

The keyword detection result may include a keyword detection probability, and the determining a keyword detection result of the audio signal according to keyword detection results of the plurality of beam signals includes determining, in a case that a keyword detection probability of at least one beam signal is greater than a preset value, that the keyword detection result of the audio signal is that a keyword is detected.

The determining the keyword detection result of the audio signal according to keyword detection results of the plurality of beam signals includes inputting keyword detection probabilities of the plurality of beam signals into a classifier, and determining whether the audio signal includes a keyword according to an output of the classifier.

In an embodiment, the determining the speech recognition result of the audio signal according to the speech recognition results of the plurality of beam signals includes obtaining linguistic scores and/or acoustic scores of the speech recognition results of the plurality of beam signals, and determining a speech recognition result having the highest score as the speech recognition result of the audio signal.

The performing speech recognition on each of the plurality of beam signals, to obtain speech recognition results of the plurality of beam signals includes respectively inputting the plurality of beam signals into corresponding speech recognition models, and performing speech recognition on the corresponding beam signals by using the speech recognition models in parallel, to obtain the speech recognition results of the plurality of beam signals.

In an embodiment, the speech recognition method may further include performing suppression processing on an echo of an audio signal outputted by a speech recognition device.

A person of ordinary skill in the art may understand that all or some of the procedures of the methods in the embodiments may be implemented by a computer program instructing relevant hardware. The program may be stored in a computer-readable storage medium. When the program runs, the procedures of the methods in the embodiments are performed. Any reference to the memory, storage, a database, or other media used in the embodiments provided in the disclosure may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external high-speed cache. As an illustration instead of a limitation, the RAM is available in various forms, such as a static RAM (SRAM), a dynamic RAM (DRAM), a synchronous DRAM (SDRAM), a double data rate SDRAM (DDR SDRAM), an enhanced SDRAM (ESDRAM), a synchronous link (Synchlink) DRAM (SLDRAM), a rambus direct RAM (RDRAM), a direct rambus dynamic RAM (DRDRAM), and a rambus dynamic RAM (DRAM).

The technical features in the embodiments may be randomly combined. For concise description, not all possible combinations of the technical features in the embodiments are described. However, the combinations of the technical features are considered as falling within the scope of the disclosure.

The foregoing embodiments show only several implementations of the disclosure and are described in detail, which, however, are not to be construed as a limitation to the scope of this disclosure. A person of ordinary skill in the art may further make several variations and improvements without departing from the scope of the disclosure, and such variations and improvements shall fall within the protection scope of the disclosure.

What is claimed is:

1. A speech recognition method, performed by an electronic device, the method comprising:
   receiving an audio signal obtained by a microphone array;
   performing a beamforming processing on the audio signal in a plurality of target directions to obtain a plurality of beam signals by a plurality of beamformers;
   performing a speech recognition on each of the plurality of beam signals to obtain a plurality of speech recognition results corresponding to the plurality of beam signals; and
   determining a speech recognition result of the audio signal based on the plurality of speech recognition results of the plurality of beam signals,
   wherein the performing the speech recognition on each of the plurality of beam signals further comprises:
      respectively inputting the plurality of beam signals into corresponding speech recognition models; and
      performing the speech recognition on the plurality of beam signals using the speech recognition models in parallel to obtain the plurality of speech recognition results of the plurality of beam signals, and
   wherein the plurality of beamformers are divided into one or more groups, each of the one or more groups corresponding to each of the speech recognition models.

2. The method according to claim 1, wherein the speech recognition result comprises a keyword detection result, and
   wherein the determining the speech recognition result of the audio signal further comprises determining a keyword detection result of the audio signal based on a plurality of keyword detection results corresponding to the plurality of beam signals.

3. The method according to claim 2, wherein the determining the keyword detection result of the audio signal further comprises, based on detecting a keyword in any one of the plurality of beam signals, determining that the keyword is detected in the audio signal.

4. The method according to claim 2, wherein the keyword detection result comprises a keyword detection probability, and
   wherein the determining the keyword detection result further comprises, based on at least one beam signal among the plurality of beam signals being greater than a preset value, determining that the keyword is detected in the audio signal.

5. The method according to claim 2, wherein the keyword detection result comprises a keyword detection probability, and
   wherein the determining the keyword detection result of the audio signal further comprises inputting a plurality of keyword detection probabilities of the plurality of beam signals into a classifier, and determining whether the audio signal includes the keyword based on an output of the classifier.

6. The method according to claim 1, wherein the determining the speech recognition result of the audio signal further comprises:
   obtaining at least one of linguistic scores or acoustic scores of the plurality of speech recognition results; and
   determining one of the plurality of speech recognition results having the highest linguistic score or the highest acoustic score as the speech recognition result of the audio signal.

7. The method according to claim 1, wherein the method further comprises performing a suppression processing on an echo of a second audio signal outputted by a speech recognition device.

8. A speech recognition apparatus, comprising:
   at least one memory storing computer program code; and
   at least one processor configured to access the at least one memory and operate as instructed by the computer program code, the computer program code comprising:
   audio signal receiving code configured to cause the at least one processor to receive an audio signal obtained by a microphone array by a plurality of beamformers;
   beamformer code configured to cause the at least one processor to respectively perform a beamforming processing on the audio signal in a plurality of target directions to obtain a plurality of beam signals;

speech recognition code configured to cause the at least one processor to perform a speech recognition on each of the plurality of beam signals to obtain a plurality of speech recognition results corresponding to the plurality of beam signals; and processing code configured to cause the at least one processor to determine a speech recognition result of the audio signal based on the plurality of speech recognition results of the plurality of beam signals, wherein the speech recognition code is further configured to cause the at least one processor to:
respectively input the plurality of beam signals into corresponding speech recognition models; and
perform the speech recognition on the plurality of beam signals using the speech recognition models in parallel to obtain the plurality of speech recognition results of the plurality of beam signals, and wherein the plurality of beamformers are divided into one or more groups, each of the one or more groups corresponding to each of the speech recognition models.

9. The speech recognition apparatus according claim 8, wherein the processing code is further configured to cause the at least one processor to determine a keyword detection result of the audio signal based on a plurality of keyword detection results corresponding to the plurality of beam signals.

10. The speech recognition apparatus according to claim 9, wherein the processing code is further configured to cause the at least one processor to, based on detecting a keyword in any one of the plurality of beam signals, determine that the keyword is detected in the audio signal.

11. The speech recognition apparatus according to claim 9, wherein the processing code is further configured to cause the at least one processor to, based on at least one beam signal among the plurality of beam signals being greater than a preset value, determine that the keyword is detected in the audio signal.

12. The speech recognition apparatus according to claim 8, wherein the speech recognition code is further configured to cause the at least one processor to:
obtain at least one of linguistic scores or acoustic scores of the plurality of speech recognition results; and
determine one of the plurality of speech recognition results having the highest linguistic score or the highest acoustic score as the speech recognition result of the audio signal.

13. The speech recognition apparatus according to claim 8, wherein the microphone array comprises at least two annular structures, and
wherein the apparatus further comprises a housing encapsulating the microphone array and the at least one processor.

14. The speech recognition apparatus according to claim 13, wherein at least three microphones are uniformly disposed on each annular structure.

15. The speech recognition apparatus according to claim 13, wherein the annular structures are concentric circles.

16. The speech recognition apparatus according to claim 15, wherein a first microphone and a second microphone on two adjacent annular structures are respectively disposed in the same directions.

17. The speech recognition apparatus according to claim 15, wherein a first microphone in a first annular structure and a second microphone in a second annular structure are disposed at an angle.

18. The method according to claim 5, wherein the classifier comprises at least one of a neural network, a support vector machine (SVM), or a decision tree.

19. A non-transitory computer-readable storage medium storing programming code, said programming code configured to cause at least one processor to:
receive an audio signal obtained by a microphone array by a plurality of beamformers;
respectively perform a beamforming processing on the audio signal in a plurality of target directions to obtain a plurality of beam signals;
perform a speech recognition on each of the plurality of beam signals to obtain a plurality of speech recognition results corresponding to the plurality of beam signals; and
determine a speech recognition result of the audio signal based on the plurality of speech recognition results of the plurality of beam signals,
wherein the at least one processor is further configured to:
respectively input the plurality of beam signals into corresponding speech recognition models; and
perform the speech recognition on the plurality of beam signals using the speech recognition models in parallel to obtain the plurality of speech recognition results of the plurality of beam signals, and
wherein the plurality of beamformers are divided into one or more groups, each of the one or more groups corresponding to each of the speech recognition models.

* * * * *